(12) United States Patent
Strandjord et al.

(10) Patent No.: US 7,515,272 B2
(45) Date of Patent: Apr. 7, 2009

(54) DIGITAL FEEDBACK SYSTEMS AND METHODS FOR OPTICAL GYROSCOPES

(75) Inventors: Lee K. Strandjord, Tonka Bay, MN (US); David A. Doheny, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 256 days.

(21) Appl. No.: 11/378,231

(22) Filed: Mar. 17, 2006

(65) Prior Publication Data

US 2009/0059237 A1   Mar. 5, 2009

(51) Int. Cl.
*G01C 19/72* (2006.01)
(52) U.S. Cl. .................................................. 356/464
(58) Field of Classification Search .......... 356/460–464
See application file for complete search history.

(56) References Cited

U.S. PATENT DOCUMENTS

| | | | |
|---|---|---|---|
| 4,705,399 A | 11/1987 | Graindorge et al. | |
| 4,869,592 A | 9/1989 | Bergh | |
| 5,056,919 A | 10/1991 | Arditty et al. | |
| 5,116,127 A * | 5/1992 | Grollmann | 356/464 |
| 5,170,225 A | 12/1992 | Ferrar | |
| 5,513,003 A * | 4/1996 | Morgan | 356/464 |
| 5,636,022 A | 6/1997 | Priest | |
| 5,781,296 A * | 7/1998 | Yamamoto et al. | 356/464 |
| 5,953,123 A * | 9/1999 | Jaklitsch et al. | 356/464 |
| 6,175,410 B1 * | 1/2001 | Szafraniec et al. | 356/459 |
| 6,744,519 B2 * | 6/2004 | Lange et al. | 356/464 |
| 7,187,448 B2 * | 3/2007 | Lehureau | 356/464 |

* cited by examiner

*Primary Examiner*—Patrick J Connolly
(74) *Attorney, Agent, or Firm*—Black Lowe & Graham PLLC

(57) ABSTRACT

A digital feedback system for an optical gyroscope include a fiber optic sensing coil, an optical phase modulator, a photo detector and a processor. The sensing coil induces a phase differential between light waves traveling though the coil. The optical phase modulator causes a second phase differential between the light waves. The photo detector receive the light waves and outputs an intensity signal representing a phase difference between the light waves. The processor determines a rate of rotation of the fiber optic sensing coil based on the phase difference. for the system operates by generating a closed loop feedback signal, demodulating the signal to determine the phase difference, determining a rate of rotation, periodically incrementing a feedback ramp signal once every τ second period based on the rate of rotation, and resetting the feedback ramp signal when the ramp is incremented a predetermined number of times since a previous reset.

12 Claims, 9 Drawing Sheets

DIGITAL FEEDBACK SYSTEMS AND METHODS FOR OPTICAL GYROSCOPES

BACKGROUND

Fiber-optic gyroscopes are used to measure rotation in navigation applications such as aircraft, missiles, satellites, and other vehicles. Fiber-optic gyroscopes measure angular rotation by determining the phase difference in light waves that propagate in opposite directions through a coil of optical fiber. Light waves that propagate through the coil in the opposite direction of the rotation take a shorter time than light waves that propagate in the direction of rotation. Many fiber-optic gyroscopes employ a closed feedback loop phase modulation scheme to increase the sensitivity of the fiber-optic gyroscope to rotation. These schemes must constantly compensate for rotation induced phase differentials to maintain a lock on the desired modulation points. One problem with these schemes is that electronics within the feedback scheme have limited output range so that feedback signals must be periodically reset in order to stay within the operating range of the electronics.

Currently, to stay within the operating range of the electronics, the rotation compensation component of the feedback scheme is reset whenever a value that produces a $2\pi$ value in optical phase is reached. While addressing the problem of the electronics having a limited output range, resetting the feedback scheme on this basis generates rate dependent sinusoidal signal (RDSs) in the gyroscopes frequency band-of-interest. Rate dependent sinusoidal signals thus create problems calculating the rotation of the vehicle.

For the reasons stated above and for other reasons stated below which will become apparent to those skilled in the art upon reading and understanding the present specification, there is a need in the art for improved feedback schemes for optical gyroscopes.

SUMMARY

Embodiments of the present invention provide digital feedback systems and methods for optical gyroscopes and will be understood by reading and studying the following specification.

In one embodiment, a method for generating a closed loop feedback signal for a fiber optic gyroscope is provided. The method comprises demodulating a signal to determine a phase difference between two counter-propagating light waves; determining a rate of rotation based on the phase difference; incrementing a feedback ramp signal once every $\tau$ second period based on the rate of rotation; and resetting the feedback ramp signal when the feedback ramp signal is incremented a predetermined number of times since a previous reset.

In another embodiment, a fiber optic gyroscope system is provided. The system comprises a fiber optic sensing coil adapted to induce a phase differential between a first light wave traveling though the fiber optic sensing coil and a second light wave traveling though the fiber optic sensing coil, when the fiber optic sensing coil is rotated about an axis; an optical phase modulator coupled to the fiber optic sensing coil, the optical phase modulator adapted to cause a second phase differential between the first light wave traveling though the fiber optic sensing coil and the second light wave traveling though the fiber optic sensing coil, wherein the optical phase modulator is further adapted to cause the second phase differential based on a modulation waveform; a photo detector coupled to the fiber optic sensing coil and adapted to receive the first light wave and the second light wave, the photo detector further adapted to output an intensity signal representing a difference in phase between the first light wave and the second light wave; a processor coupled to the photo detector and adapted to determine a rate of rotation of the fiber optic sensing coil based on the difference in phase between the first light wave and the second light wave; wherein the processor is further adapted to generate a feedback ramp signal based on the on the rate of rotation of the fiber optic sensing coil, wherein the processor is further adapted to reset the feedback ramp signal based on a fixed frequency; and wherein the processor is further adapted to output the feedback ramp signal as a first component of the modulation waveform.

In yet another embodiment, a system for generating a closed loop modulation waveform feedback signal for an optical gyroscope is provided. The system comprises means for demodulating signal to determine a phase difference between a first light wave and a second light wave; means for determining a rate of rotation based on the phase difference between the first light wave and the second light wave, the means for determining the rate of rotation responsive to the means for demodulating; means for generating a feedback ramp signal, wherein the means for generating the feedback ramp signal increments the feedback ramp signal based on the rate of rotation, the means for generating the feedback ramp signal responsive to the means for determining the rate of rotation; and means for resetting the feedback ramp signal when the ramp is incremented a predetermine number of times since a previous reset, the means for resetting the feedback ramp signal responsive to the means for generating the feedback ramp signal.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
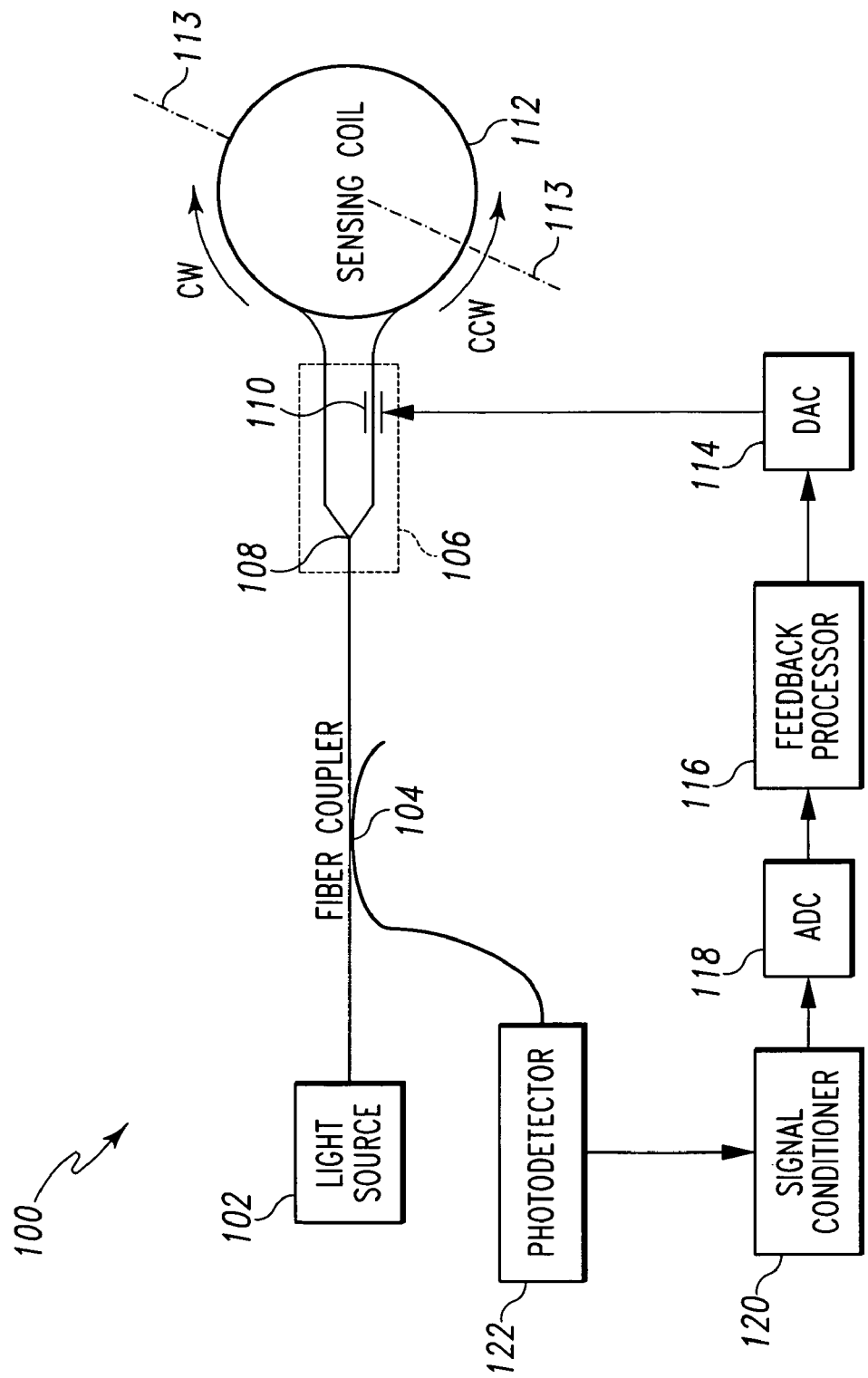
FIG. 1 is a block diagram illustrating an optical gyroscope of one embodiment of the present invention.

FIG. 1 is a diagram illustrating an optical gyroscope 100 of one embodiment of the present invention. Optical gyroscope 100 comprises a light source 102 an optical splitter 108, a phase modulator 110, a sensing coil 112, and a fiber coupler 104. Sensing coil 112 includes a coiled optical fiber wound about an axis 113 around which rotation is to be sensed. In one embodiment, optical splitter 108 and phase modulator 110 are both implemented by a single integrated optics multifunction chip.

In operation, a light wave is introduced by light source 102 and split into a pair of waves at y-junction 108 propagating in a clockwise (cw) and counterclockwise (ccw) directions through sensing coil 112. Any rotation about the axis 113 of sensing coil 112 provides an effective increase in the optical path traveled by light in one direction and a decrease in the optical path in the other direction. The optical path length differences induced by rotating sensing coil 112 introduces a phase shift between the clockwise and counterclockwise propagating waves, generally known as the Sagnac effect.

The phase difference between the two counter propagating light waves is modulated by an optical phase modulator 110 (sometime also known as a bias modulator) in order to enhance the ability to detect rotation from the phase differential of the light waves. In one embodiment, the phase of the first propagating light wave is modulated as it leaves sensing coil 112 while the phase of the second propagating light wave is modulated as it enters sensing coil 112. After exiting sensing coil 112, the two returning light waves are recombined at the y-junction 108 while traveling back towards the light source 102. The difference in phase between the returning light waves is a function of the rotational velocity of sensing coil 112. In one embodiment, for medium and high performance fiber optic gyroscopes, phase modulation is generated with digital electronics.

Figure 3:
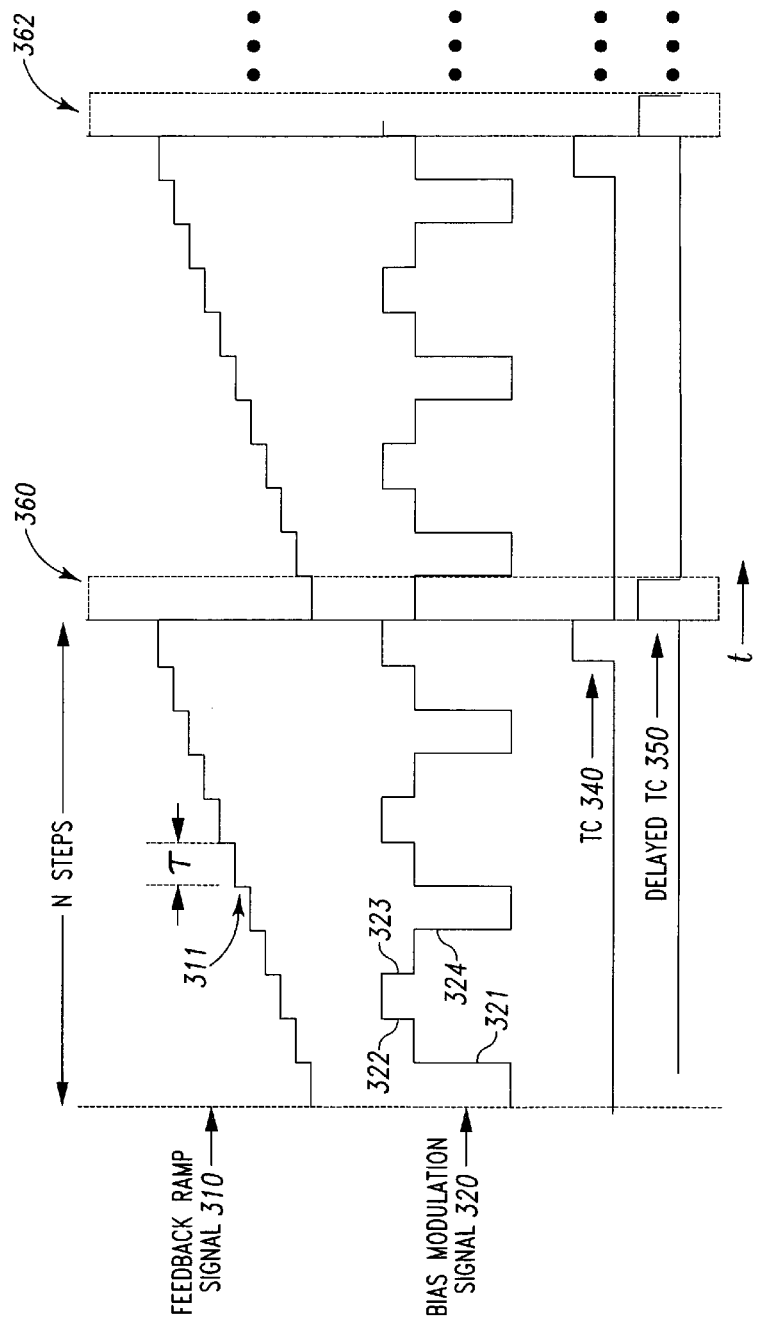
FIG. 3 illustrates a feedback ramp signal and bias modulation signal of one embodiment of the present invention.

The modulation waveform employed by phase modulator 110 is a composite of a bias modulation voltage signal of frequency ($f_b$), and a feedback ramp voltage signal, shown generally in FIG. 3 at 320 and 310, respectively. Phase modulator 110 operates such that when a modulation waveform having a voltage of $V\pi$ is applied to phase modulator 110, it will induce a phase shift of exactly 180 degrees between the cw and ccw light waves. Varying the bias modulation signal component of the modulation waveform induces a known phase shift into the propagating light signal that allows sampling the recombined light wave at specific operating points (also known as "lock" points) that improve sensitivity to rotation.

For high performance fiber optic gyroscopes, bias modulation signal 320 is configured to provide operating points at $\pm\pi/2$ and $\pm 3\pi/2$ of optical phase difference between the counter-propagating light waves. One reason these particular operating points are advantageous is that they represent the regions of a cosine curve that are most approximately linear. In one embodiment, the bias modulation signal consists of four steps (shown generally in FIG. 3 at 321-324), each step providing a different operating point for a period of one $\tau$ in duration, (where $\tau$ is the time it takes light to travel through fiber sensing coil 112.) Typical ranges of the bias modulation frequency ($f_b$) are 20 kHz to 100 kHz and depend on the length of the sensing coil 112 that is used in the gyroscope 100 of FIG. 1. However, alternate operating points and bias modulation frequencies outside of this range are also contemplated as within the scope of embodiments of the present invention. The ramp feedback signal (shown generally in FIG. 3 at 310) provides closed loop feedback to phase modulator 110 and comprises a staircase shaped voltage signal consisting of a sequence of voltage steps (shown generally in FIG. 3 at 311), each step of duration $\tau$. Because rotation of sensing coil 112 produces additional phase shifting of the two returning light waves, in the absence of a closed loop feedback signal, phase modulator 110 would not be able to maintain a lock on the desired operating points based on bias modulation signal 320 alone. Ramp feedback signal 310 provides an error signal based on the rotation of sensing coil 112, that when summed with bias modulation signal 320 enables phase modulator 110 to operate at the desired operating points. Thus, in general, the amplitude of each step change in feedback ramp signal 310 is a function of the rotational velocity of sensing coil 112 about axis 113.

To generate the modulation waveform, gyroscope 100 further includes a feedback circuit comprising a fiber coupler 104, a photo-detector 122, an analog to digital converter (ADC) 118, a feedback processor 116, and a digital to analog converter (DAC) 114. In one embodiment, feedback processor 116 is implemented via a digital signal processor, a field programmable gate array, or other programmable processor.

In one embodiment, fiber coupler 104 receives the combined returning light waves and redirects them to photo-detector 122. At photo-detector 122, differences in phase between the returning light waves results in a mutual interference pattern between the waves, which in turn affects the intensity of the light signal observed by photo-detector 122. In one embodiment, the intensity (I) of the observed light is described by the equation I=[(Io)/2*(1+cos($\Delta\Phi$))], where $\Delta\Phi$ is the difference in phase between the two returning light waves, and Io is the peak intensity of the light when $\Delta\Phi$ is zero.

Photo-detector 122 converts the resulting intensity value in to a voltage signal that is a function of the rotational velocity of sensing coil 112. In one embodiment, the output of photo-detector 122 is passed through a signal conditioner 120 to remove any DC components in the signal, which may have been introduced by photo-detector 122. In one embodiment, the signal conditioner 120 further provides additional signal conditioning, such as, but not limited to, additional AC gain, and antialiasing filtering. The voltage signal is digitized by analog to digital converter 118.

The digitized voltage signal is then passed to feedback processor 116. Feedback processor 116 extracts rotational velocity information from the digitized voltage signal. The velocity information, in part, is used to develop the feedback ramp signal 310 component of the modulation waveform, as described in more detail below.

Figure 2:
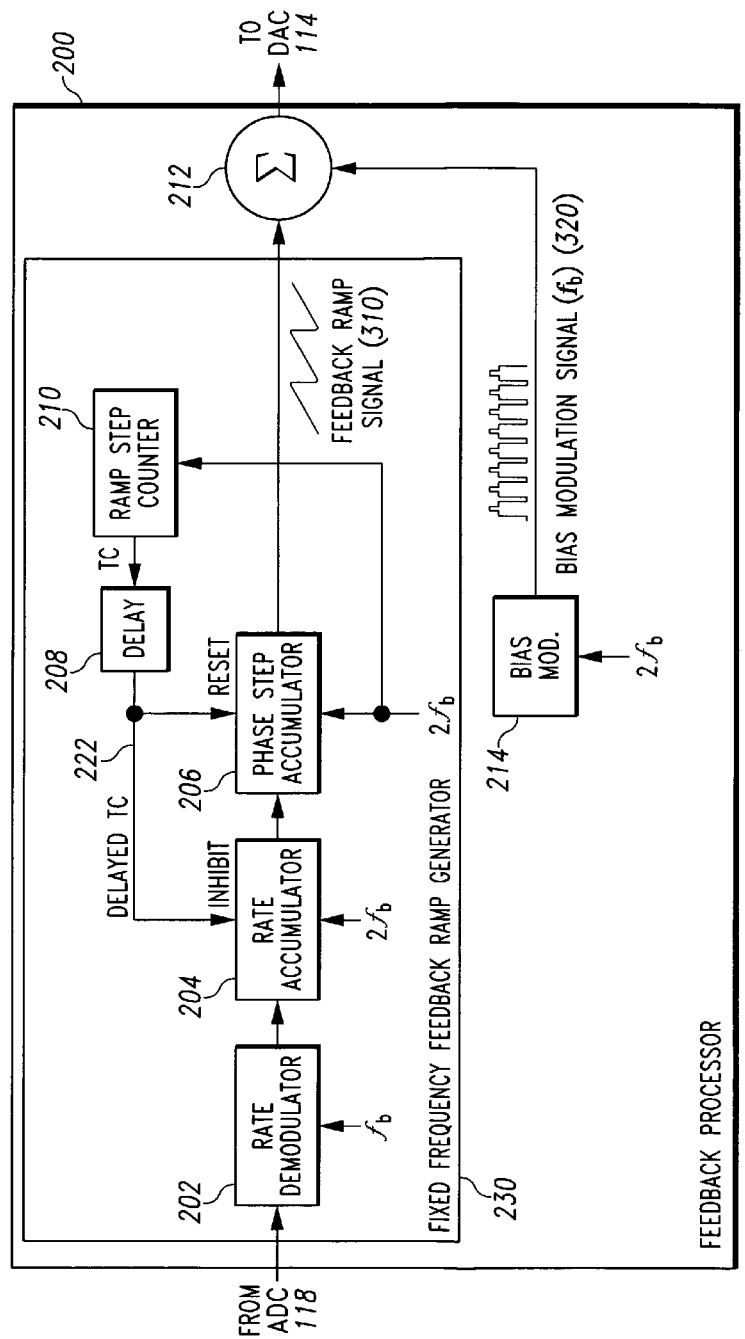
FIG. 2 is a block diagram illustrating a feedback processor of one embodiment of the present invention.

FIG. 2 illustrates a feedback processor 200 of one embodiment of the present invention.

In one embodiment, feedback processor 200 describes the feedback processor 116 of gyroscope 100 as shown in FIG. 1. Feedback processor 200 comprises a rate demodulator 202, a rate accumulator 204, a phase step accumulator 206, a ramp step counter 210, a bias modulator 214 and a summer 212.

In one embodiment, in operation, rate demodulator 202 receives the digitized voltage signal from ADC 118 and demodulates the signal using the bias modulation signal frequency ($f_b$). The bias modulation signal provides a reference phase differential such that when the known phase shift reference is put in (i.e. phase modulator 110 modulates at one of the operating points), and the known phase reference is then removed by rate demodulator 202, any remaining phase difference in the output of rated demodulator 202 represents the rate of rotation sensed by sensing coil 112. Accordingly, when the sensing coil 112 is not rotating, the output of rate demodulator 202 is zero.

The rate accumulator 204 integrates the output of the rate demodulator 202 and outputs an un-normalized rate signal that is proportional to rotation rate sensed by sensing coil 112. In one embodiment, to provide an angular rotation output measurement, the un-normalized rate signal is provided to a normalizer (not shown) that divides the un-normalized rate signal by an estimated value of $V\pi$ to normalize the value, which is then integrated by an angle accumulator (not shown) to produce an output signal that represents the angular displacement of sensing coil 112.

To achieve closed loop feedback, in one embodiment, phase step accumulator 206 receives the un-normalized rate signal from rate accumulator 204 and generates the feedback ramp signal 310 by accumulating the output of rate accumulator 204. Because digital to analog converter 114 has only a finite range of voltages it can produce, the staircase shaped feedback ramp signal 310 cannot increase indefinitely. Thus, feedback processor 200 periodically resets phase step accumulator 206 resulting in the saw-tooth feedback waveform shown generally in FIG. 3 at 310.

In one embodiment, periodic reset of phase step accumulator 206 is performed by ramp step counter 210. Ramp step counter 210 counts the step increases in feedback ramp signal 310, up to a specified number of ramp steps (Nsteps), and then resets phase step accumulator 206, which in turn resets feedback ramp signal 310. The resulting saw-tooth feedback waveform (shown generally at 310) has a constant frequency which is based on the specified number of ramp steps allowed between resets. Because ramp step counter 210 resets the phase step accumulator 206 as a function of time (i.e., a specified number of $\tau$ second ramp steps) rather than as a function of feedback ramp signal 310's amplitude, embodiments of the present invention provide a feedback ramp signal to phase modulator 110 having a fixed frequency and a variable amplitude, rather than a variable frequency and a fixed amplitude. Because this fixed frequency is selected by design, the number of ramp steps that occur before a reset is chosen such that any undesirable output rate oscillations resulting from feedback ramp signal 310 occur outside a critical frequency band of interest for a particular application. In contrast, as would be appreciated by one skilled in the art upon reading this specification, resetting a feedback ramp signal based upon reaching a fixed amplitude (such as every $2\pi$) results in oscillations having frequencies tied to the rotation signal of interest. By selecting the appropriate frequency for feedback ramp signal 310, a user is able to substantially avoid gyroscope errors created by the feedback ramp signal 310 from having a frequency in the critical frequency band of the application. In one embodiment, the reset frequency is set greater than a system sampling frequency (i.e., the data rate of gyroscope 100's output signal) to ensure that rate dependent sinusoidal errors occur at frequencies above the system sampling frequencies of the rotational data of interest. In one embodiment, the reset frequency is set above a maximum rotational frequency that would be expected from gyroscope 100 operating at the high end of its rated range. In one embodiment, when desired, these errors can then be completely removed from the gyroscope 100 output signal with an optional digital notch filter (not shown).

In one embodiment, ramp step counter 210 counts each step increase from phase step accumulator 206 and produces a terminal count output pulse (TC) (shown in FIG. 3 generally at 340) when phase step accumulator 206 has increased the feedback ramp the specified number of ramp steps (Nsteps). Based on the terminal count output pulse phase step accumulator 406 is reset, thus resetting the feedback ramp signal.

In one embodiment, the bias modulation frequency signal 320, discussed above, is generated by feedback processor 200 via bias modulator 214. Bias modulation signal 320 is summed with the feedback ramp by summer 212. The resulting combined signal is converted into a digital voltage signal by DAC 114 to provide the modulation waveform for phase modulator 110.

As would be appreciated by one skilled in the art upon reading this specification, resetting the feedback signal 310 after an arbitrary number of steps results in an interruption through the cycle of operating points that results in a period of unreliable data (shown in FIG. 3 generally at 360 and 362) for a period of one $\tau$ after the reset. To mitigate the occurrence of this period of unreliable data, feedback processor 200 further comprises a delay 208 coupled to receive the terminal count output pulse (TC). Delay 208 adds a one $\tau$ delay to the terminal count output pulse creating a delayed terminal count output pulse (delayed TC). The delayed terminal count output pulse (shown in FIG. 3 generally at 350) resets phase step accumulator 206 (which resets feedback ramp signal 310) and inhibits rate accumulator 204 from operating for one $\tau$ after the ramp reset. This blocks the unreliable data from being processed by rate accumulator 204.

One consequence associated with blocking unreliable data after each reset of feedback ramp signal 310 is that the blocking of the data, combined with any conversion error introduced by digital to analog converter 114, results in a higher noise output in signals carrying the rotation information. Because the level of noise depends on the number of ramp steps between resets, the noise level is reducible by increasing the number of ramp steps between resets (i.e., by decreasing the ramp reset frequency). In addition to the noise, a non $2\pi$ reset will also cause a spike in the analog signal at photodetector 122 that can result in saturating electronics coupled to photo-detector 122. To protect against this problem, in one embodiment, signal conditioner 120 further includes an anti-saturation function which the limits amplitude of voltage signals sent to analog to digital converter 118. Increased scale factor errors can also result from the combination of blocking of the one $\tau$ of unreliable data and nonlinearity associated with digital to analog converter 114. Theses scale factor errors are also reducible by decreasing the ramp reset frequency.

As previously discussed, by selecting the appropriate frequency for feedback ramp signal 216, a user is able to mitigate rate dependent sinusoids by shifting gyroscope errors created by the feedback ramp signal 216 beyond the band of frequencies carrying the rotational data of interest. At the same time, noise and scale factor errors increase with increases in the ramp reset frequency. Therefore, there is a tradeoff between adjusting the ramp reset frequency to diminish noise and scale factor errors while still providing the desired frequency separation between rate dependent sinusoids introduced by the feedback ramp signal and the critical frequency band of the application, because reducing the ramp reset frequency reduces the maximum sensing rate of the gyroscope.

Because there are many applications that require both low noise levels and the ability to accurately measure relatively high maximum rotational rates, other embodiments of the present invention provide a feedback modulation scheme that employs both a fixed frequency feedback ramp and a fixed amplitude feedback ramp. Such embodiments have the benefits of both schemes, namely low noise, no ramp induced errors in the critical frequency band, low scale factor errors and high maximum sensing rates.

Figure 4:
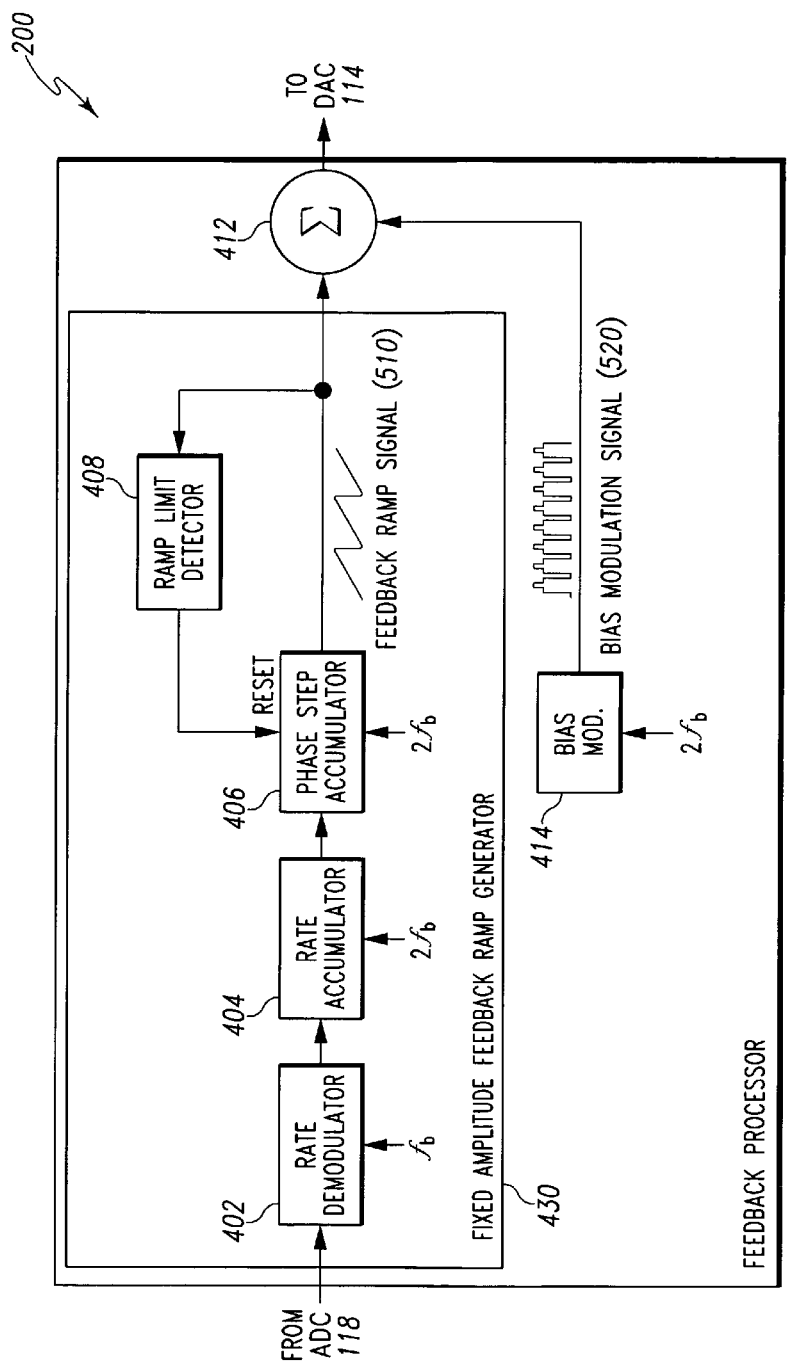
FIG. 4 is a block diagram illustrating a feedback processor of one embodiment of the present invention.

FIG. 4 illustrates one embodiment of a feedback processor 400 having a fixed amplitude feedback ramp generator 430 for producing a modulation waveform having a fixed amplitude feedback ramp signal component. In one embodiment, fixed amplitude feedback ramp generator 430 comprises a rate demodulator 402, a rate accumulator 404, a phase step accumulator 406, and a ramp limit detector 408. Feedback processor 400 further comprises a bias modulator 414 and a summer 412. Rate demodulator 402, rate accumulator 404, and phase step accumulator 406 have the same functionality and operate as described with respect to rate demodulator 202, rate accumulator 204, and phase step accumulator 206 of FIG. 2. In addition, bias modulator 414 generates a bias modulation signal having the same features and characteristics as bias modulation signal 320 (shown in FIG. 3) and is illustrated by FIG. 5 generally at 520

In one embodiment, the output of rate accumulator 404 is proportional to rotation rate experienced by sensing coil 112 and is provided to phase step accumulator 406, which generates a feedback ramp signal (shown generally in FIG. 5 at 510) by accumulating the output of the rate accumulator 404. In contrast to ramp step counter 210 of FIG. 2, which resets phase step accumulator 206 after a certain number of step increases, ramp limit detector 408 resets phase step accumulator 406 when feedback ramp signal 510 reaches an amplitude that causes an optical phase shift of $2\pi$. In one embodiment, bias modulation signal 520 is summed with feedback ramp signal 510 by summer 412, and converted from a digital signal to an analog voltage by digital to analog converter 114, to create the modulation waveform input for a phase modulator, such as phase modulator 110.

Figure 5:
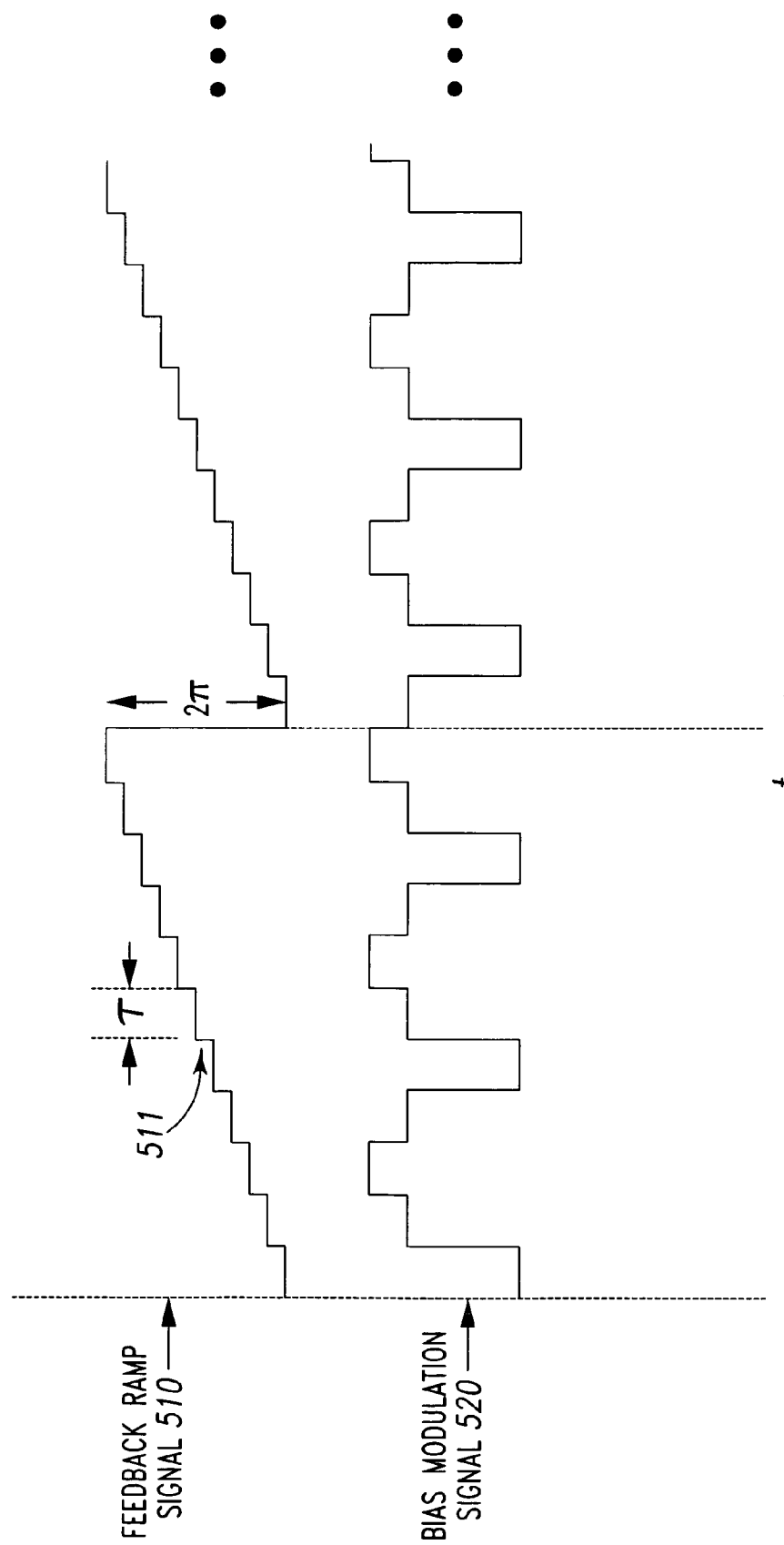
FIG. 5 illustrates a feedback ramp signal and bias modulation signal of one embodiment of the present invention.

As illustrated in FIG. 5, in one embodiment, feedback ramp signal 510 comprises a staircase waveform having a constant amplitude and a variable frequency. The frequency of feedback ramp signal 510 is variable because the number of $\tau$ second step increments (illustrated generally at 511) that occur between resets is not a constant, but will vary depending on the rotational rate of sensing coil 110. Because the incremental signal increase caused by each step increment is a function of the rotation of sensing coil 112, the amount of time which will elapse before feedback ramp signal 510 reaches an amplitude that causes an optical phase shift of $2\pi$ will not be constant. Thus, ramp limit detector resets phase step accumulator 406 whenever feedback ramp signal 510 reaches that amplitude.

Resetting the amplitude of the feedback ramp signal 510 at the $2\pi$ optical phase shift voltage has the advantage of reduced noise and scale factor errors for high rotation rates when compared to a system employing a fixed frequency feedback ramp. However, making the feedback ramp 510 reset at a fixed amplitude results in rate dependent sinusoid errors that occur at the same frequency and harmonics bands as the rotational information of interest. Since the frequency of feedback ramp signal 510 depends on the input rotation rate of the gyroscope 100, resulting gyroscope errors also depend on rotation rate. Furthermore, as would be appreciated by one skilled in the art upon reading this specification, the amplitude of these gyroscope errors will increase with decreasing rotation rates. Thus, fixed amplitude feedback ramp signals cause problems for applications that involve low rotation rates.

Figure 6:
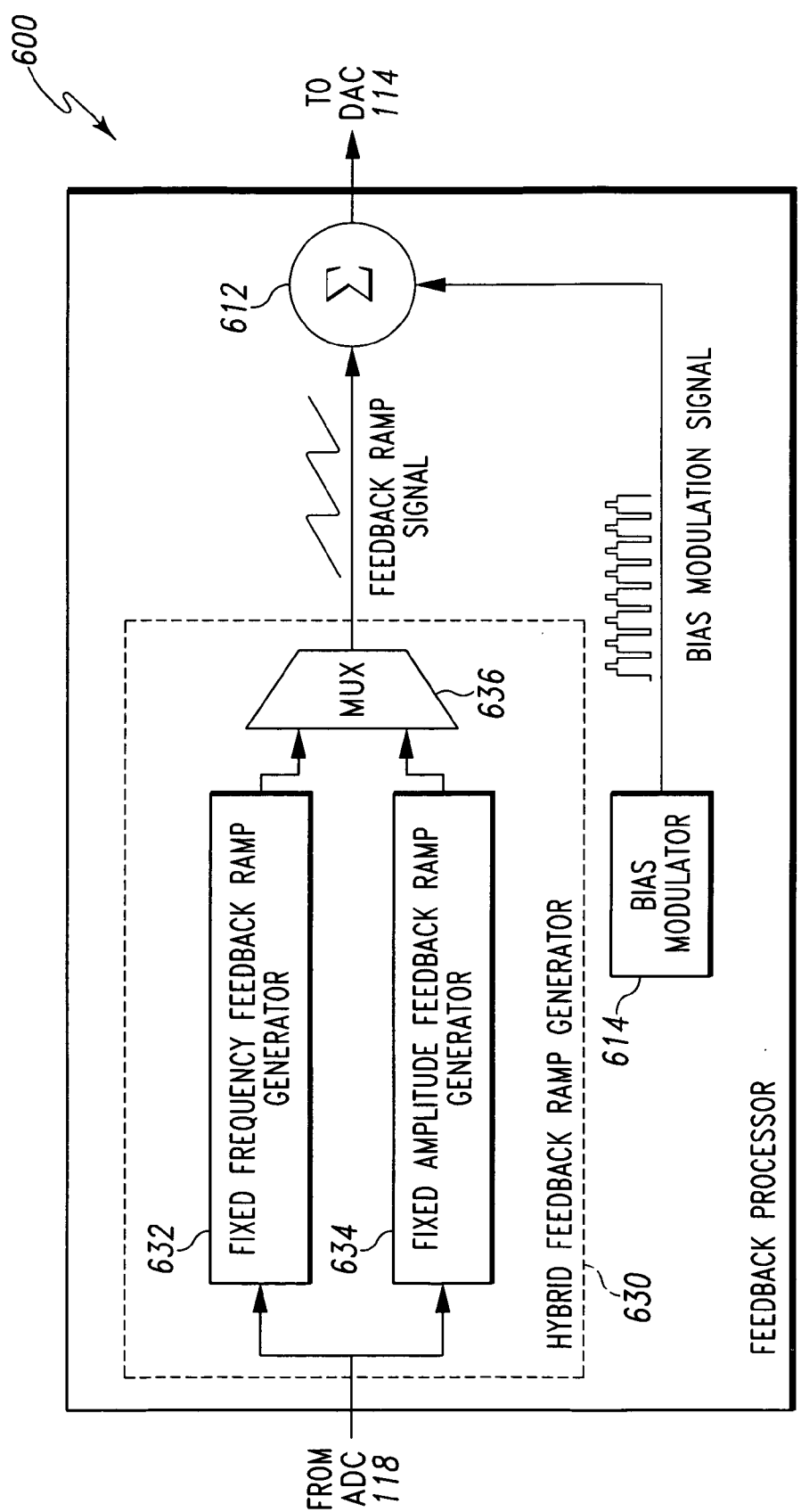
FIG. 6 is a block diagram illustrating a feedback processor of one embodiment of the present invention.

FIG. 6 is a block diagram illustrating a feedback processor 600 of another embodiment of the present invention. Feedback processor 600 comprises a hybrid feedback ramp generator 630 having a fixed frequency feedback ramp generator 632 and a fixed amplitude feedback ramp generator 634. Fixed frequency feedback ramp generator 632 includes the same functionality as described with respect to fixed frequency feedback ramp generator 230 in FIG. 2. Fixed amplitude feedback ramp generator 634 includes the same functionality as described with respect to fixed amplitude feedback ramp generator 430 in FIG. 4. Feedback processor 600 further comprise a bias modulator 614 for generating a bias modulation signal having the same features and characteristics as bias modulation signals 320 and 520 (shown in FIGS. 3 and 5 respectively.) In one embodiment, the output of either fixed frequency feedback ramp generator 632 or fixed amplitude feedback ramp generator 634 is selected by MUX 636 and combined with the bias modulation signal output of bias modulator 614 by summer 612. In one embodiment, the summed signal is converted to an analog voltage by digital to analog converter 114 to generate the modulation waveform used by phase modulator 110.

For the hybrid approach of this embodiment, MUX 636 selects and outputs a fixed frequency feedback ramp developed by fixed frequency feedback ramp generator 632 for low rotation rates and a fixed amplitude feedback ramp developed by fixed amplitude feedback ramp generator 634 for high rotation rates. In one embodiment, MUX 636 switches from outputting a fixed frequency ramp signal to a fixed amplitude ramp signal when the rotation rates are sufficiently high that the fixed frequency feedback ramp reaches an amplitude providing $2\pi$ of phase shift before frequency feedback ramp generator 632 resets the fixed frequency ramp signal based on the number of ramp steps. The rotation rate at which the switch over occurs depends on the frequency (i.e. the specified number of ramp steps) of the fixed frequency ramp. By implementing the hybrid approach, excess noise and scale factor errors can be reduced to acceptable limits without sacrificing maximum rotation rate range.

Figure 7:
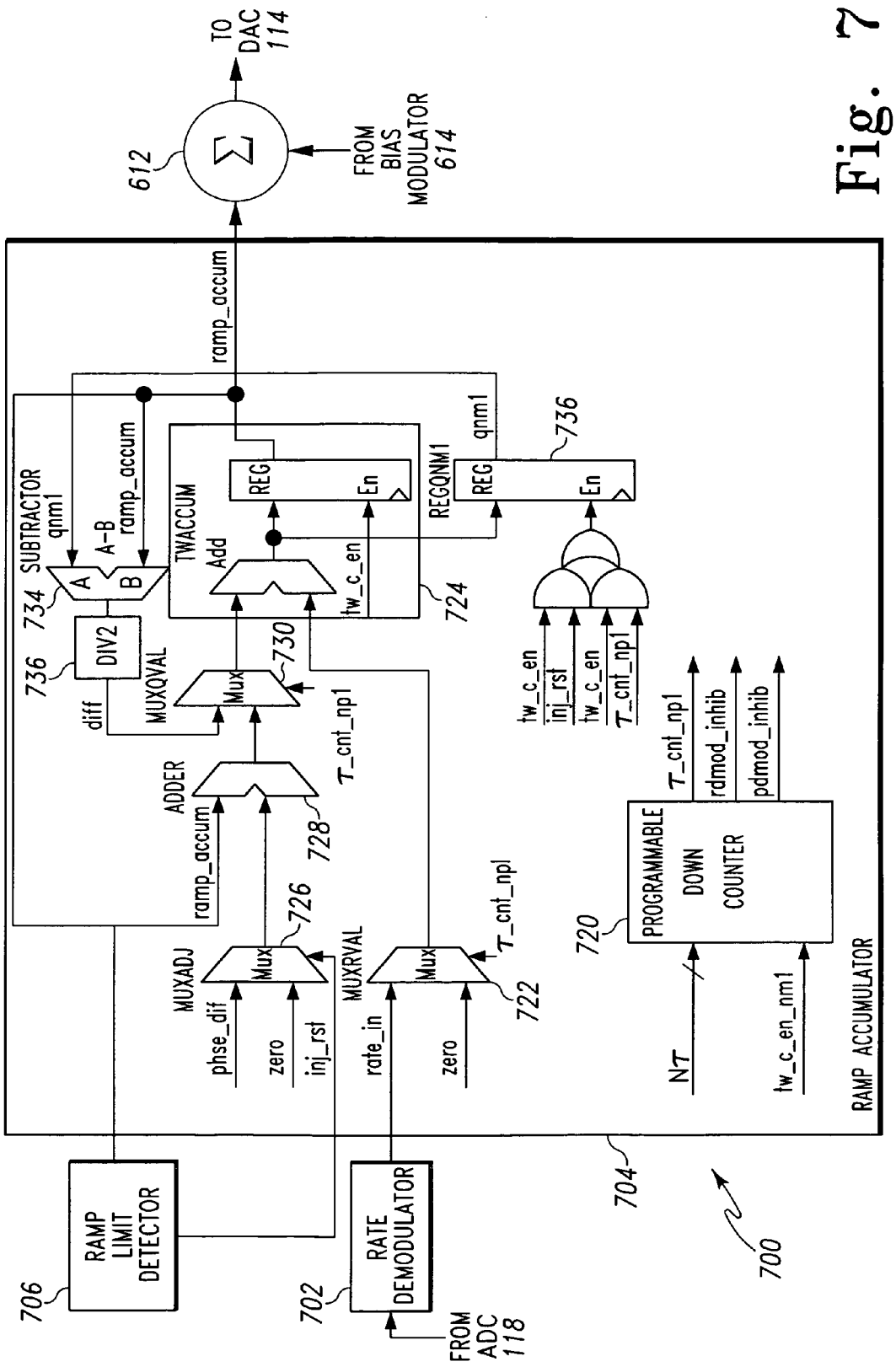
FIG. 7 is a block diagram illustrating one embodiment of the present invention.

FIG. 7 is a diagram illustrating another hybrid feedback ramp generator 700 of one embodiment of the present invention. In one embodiment, hybrid feedback ramp generator 700 is used to implement hybrid feedback ramp generator 630 as described with respect to FIG. 6.

Hybrid feedback ramp generator 700 comprises a rate demodulator 702, a ramp accumulator 704 and a rate limit detector 706. Rate demodulator 702, has the same functionality and operates as described with respect to rate demodulators 202 and 402, discussed above. In operation, at low rotational rates, ramp accumulator 704 generates a feedback ramp signal based having fixed frequency. At low rotational rates, the reset frequency is governed by a programmable down counter 720 that is loaded with a value representing the desired number of ramp steps between resets ($N\tau$). In one embodiment, programmable down counter 720 is a twelve bit programmable down counter. Programmable down counter 720 decrements its count by one after every $\tau$ second time period. In one embodiment, $N\tau$ is loaded into programmable down counter 720 during a master reset to the system, when programmable down counter 720's count reaches a value of 001, or when a fixed amplitude reset (discussed below) occurs.

Programmable down counter 720 transitions control signal $\tau$-cnt-np1 from an active logical low to an active logical high when programmable down counter 720 reaches 001, and $\tau$-cnt-np1 remains at a logical high for a one $\tau$ time duration. When $\tau$-cnt-np1 remains a logical low, multiplexer MUXRVAL 722 selects the rotational rate output from rate demodulator 702 and outputs the rotational to TWACCUM 724 adder inputs. When $\tau$-cnt-np1 is an active logical high, MUXRVAL 722 selects a zero input as it's output to TWACCUM 724, to inhibit TWACCUM 724 from adjusting the feedback ramp signal based on the unreliable data that occurs during the one τ period after a ramp reset.

During operation at low rotational rates, inj_rst will remain low. Rate limit detector 706 measures the amplitude of the feedback ramp signal output from ramp accumulator 704 and provides inj_rst to ramp accumulator 704. When the amplitude of the feedback ramp signal reaches a predetermined amplitude limit (such as when the amplitude is sufficient to generate a 2π optical phase shift), rate limit detector 706 transitions inj_rst from a logical low to a logical high. Inj_rst will remain low at low rotation rates because programmable down counter 720 will always reach 001 prior to the feedback ramp signal reaching the predetermined amplitude limit.

Because inj_rst remains an active logical low in the fixed frequency feedback ramp mode of operation, multiplexer MUXADJ 726 selects a zero input as output to ADDER 728. This insures that a fixed amplitude based reset cannot occur during fixed frequency feedback ramp operation. When τ-cnt-np1 remains a logical low, multiplexer MUXQVAL 730 selects the output of ADDER 728 to send to TWACCUM 724. TWACCUM 724 adds the output from MUXQVAL 730 to the output of MUXRVAL 722 and stores that sum in its register (REG). As long as programmable down counter 720 has not reached a value of 001 and inj_rst remains an active logical low, TWACCUM 724 will accumulate the rate values from rate demodulator 702 and every τ output an incremented feedback ramp signal (to summer 612, for example) based on the accumulated rate values.

When programmable down counter 720 reaches 001, it is time to reset the feedback ramp signal, and τ-cnt-np1 transitions to a logical high. The amount to reset the feedback ramp signal is based on an average of qnm1 (i.e., the feedback ramp signal value registered before the previous reset) and the current feedback ramp signal value (i.e., the current ramp_accum value is that value that has been accumulating since the last reset). The value of ramp_accum is subtracted from qnm1 by subtractor 734 and divided by two by DIV2 736. When τ-cnt-np1 transitions to a logical high, MUXQVAL 730 selects the output from DIV2 736 rather than the output of Adder 728 to send to TWACCUM 724. The input to the TWACCUM 724 register is then the sum of the DIV2 736 and MUXRVAL 722 outputs. During this time, because the MUXRVAL 722 output is zero, the sum of the DIV2 736 and MUXRVAL 722 outputs is the divide by two of the current ramp_accum value subtracted from the qnm1 value. The result of this addition is then registered in the TWACCUM 724's REG 732 at the rising edge of the clock input (En), when the register's triangle clock enable, tw_c_en, is active logical high. The tw_c_en signal is active high for one clock input period once every τ time frame. In essence the operation described above is performing an average of ramp accumulator 704's output over the reset period defined by programmable down counter 720 and using that value to reset ramp accumulator 704, thereby centering the feedback ramp signal output over the reset period and minimizing any feed forward bias.

As previously discussed, a fixed frequency reset occurs every time down counter 720 reaches a value of 001. To insure a correct reset value is available when transitioning from fixed amplitude reset operation (discussed below) to fixed frequency reset operation, the output register REGQNM 736, which holds the value of qnm1, is updated with the current value of ramp_accum every time tw_c_en and inj_reset are logical high, which occurs during all fixed amplitude resets. During the fixed frequency feedback reset operation, qnm1 is updated to the output of REGQNM1 736 every time tw_c_en, and τ-cnt-np1 are logical high, which is every time programmable down counter 720 reaches a value of 001.

After a fixed frequency reset, the output of rate demodulator 702 contains data that is potentially corrupt. This data must be inhibited from being fed forward into the control loop. In one embodiment, ramp accumulator 704 outputs a rate demodulator inhibit signal, rdmod_inhib, to rate demodulator 702 to prevent corrupted information being presented to ramp accumulator 704. In one embodiment, rdmod_inhib inhibits rate demodulator 702 to prevent one or more τ second periods of data from being presented to ramp accumulator 704.

In one embodiment, a bias modulator, such as bias modulator 614 generates a bias modulation signal based on an estimate of the value of Vπ (i.e., the voltage applied to phase modulator 110 which will yield a 180 degree optical phase shift). This estimate is typically derived from a demodulated representation of the voltage output from photodetector 112. Just as the unreliable data following a feedback ramp reset must be blocked to avoid corruption of the feedback ramp signal, the unreliable data must also be blocked to avoid corruption of the Vπ estimate used to generate the bias modulation signal. Accordingly, in one embodiment, ramp accumulator 704 outputs a pi demodulator inhibit, pdmod_inhib signal to prevent corrupted information from being presented to the Vπ estimation processes. In one embodiment, pdmod_inhib, inhibits one or more τ periods of corrupted data from the pi demodulation process after a reset occurs.

In operation, at high rotational rates, ramp accumulator 704 generates a feedback ramp signal which reaches the predetermined amplitude limit (such as when the amplitude is sufficient to generate a 2π optical phase shift) prior to a fixed frequency based reset occurring. When the amplitude of the feedback ramp signal reaches the predetermined amplitude limit, rate limit detector 706 transitions inj_rst from a logical low to a logical high. In one embodiment, the inj_rst signal transitions from a logical low to a logical high and remains logical high for a two τ period, at which time it transitions back to a logical low.

The τ-cnt-np1 signal will remain a logical low signal during high rotational rate operation because programmable down counter 720 will not have a chance to count down to 001 before the next amplitude based reset occurs. Under such conditions, MUXRVAL 722 will always select the output of rate demodulator 702 to send to TWACCUM 724.

Prior to the feedback ramp signal reaching the predetermined amplitude limit, inj_rst remain a logical low and MUXADJ 726 selects the zero input to output to ADDER 728. ADDER 728 adds the zero input to the current value of ramp_accum and outputs the result to MUXQVAL 730. Because τ-cnt-np1 is a logical low, MUXQVAL 730 selects the output of ADDER 728 to output to TWACCUM 725 which sums the current value of ramp_accum with rate information from rate demodulator 702.

When the amplitude of the feedback ramp signal reaches the predetermined amplitude limit, rate limit detector 706 transitions inj_rst from a logical low to a logical high. In one embodiment, inj_rst, assumes a logical high value for a two τ period. During this period MUXADJ 726 selects the phase difference input, phse_dif as it's output to ADDER 728. The phse_dif signal defines the magnitude of the reset for the feedback ramp signal. In order the avoid the corruption of data following the reset, phse_dif must provide for a reset of the feedback ramp signal which will result in an optical phase shift of ±2π. In one embodiment, the ±2π phase shift is accomplished over a two τ period by first adding a ±π/2 phase shift over the first τ period and adding a ±3π/2 phase shift over the second τ period. The value of phse_dif is added ramp_accum by ADDER 728 and the resulting signal is forward through MUXQVAL 730 to adjust the TWACCUM 732 register thereby causing the reset to the feedback ramp signal.

Figure 8:
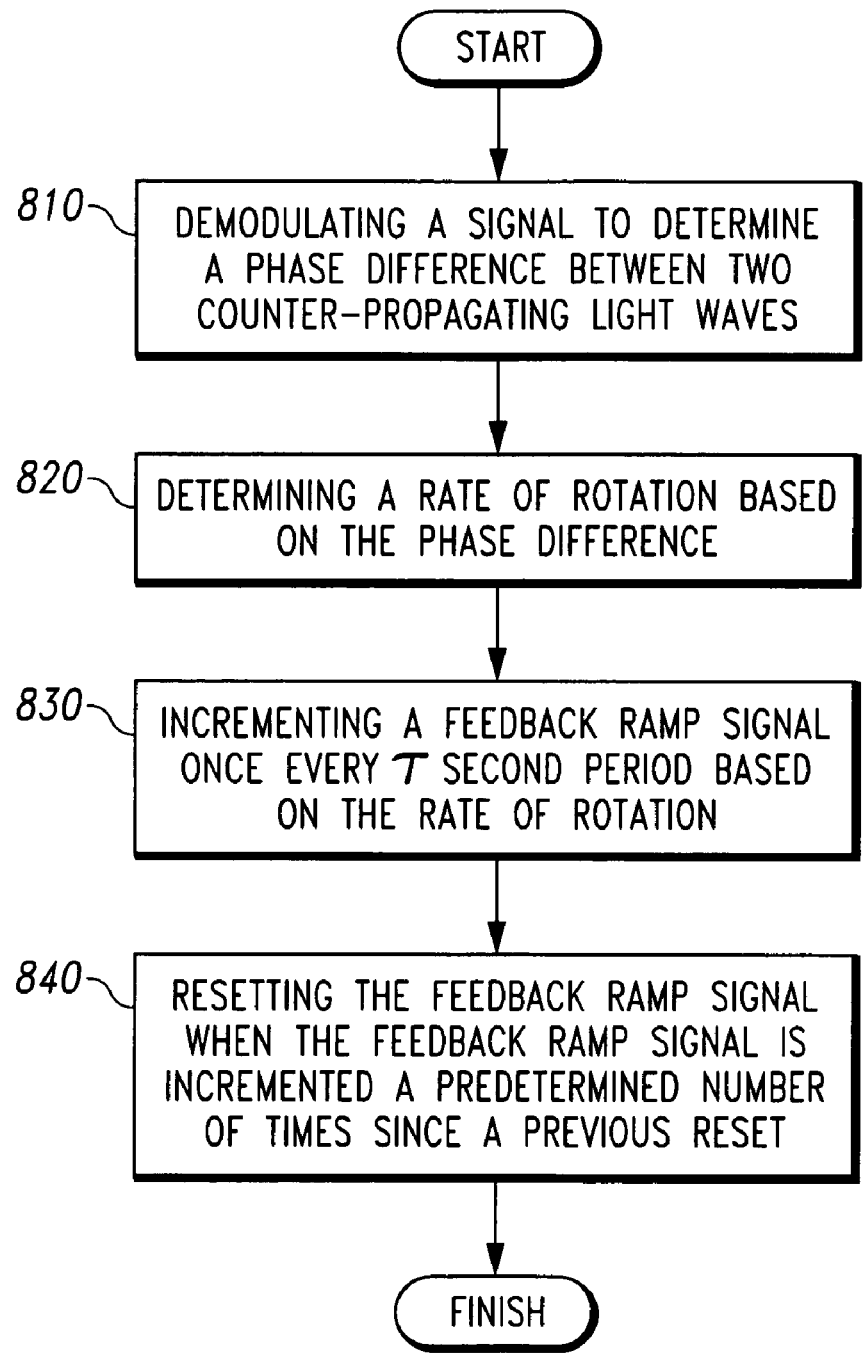
FIG. 8 is a flow chart illustrating a method of one embodiment of the present invention.

FIG. 8 is a flow diagram illustrating a method of one embodiment of the present invention, for generating a closed loop feedback signal for a fiber optic gyroscope. The method begins at 810 with demodulating a signal to determine a phase difference between two counter-propagating light waves. In an optical gyroscope, a light wave is split and propagates in opposite directions through a coiled optical fiber wound about an axis of rotation. Rotation about the axis induces a phase shift between the two counter-propagating light waves. When the split light waves are recombined and the intensity of the combined light signal is measured by a photodetector, the detector outputs a signal that represents the measured intensity, and is a function of the phase difference between the two counter-propagating light waves. Phase modulating the two counter-propagating light waves by a known phase angle provides a reference point so that when the signal is demodulated at 810, the result is a phase difference that is proportional to any rotation of the coiled optical fiber about the axis of rotation. The method then proceeds to 820 with determining a rate of rotation of the coiled optical fiber based on the phase difference. In one embodiment, integrating the rate of rotation provides an angle representing angular displacement of the coiled optical fiber. To maintain modulation of the two counter-propagating light waves at desired operating points, the modulation must be adjusted to compensate for phase shifts induced by rotation of the coiled optical fiber. Thus, the method proceeds to 830 with incrementing a feedback ramp signal once every τ second period based on the rate of rotation, where τ is the time required for light to travel through the coiled optical fiber. For the reasons discussed above, the electronics that implement the feedback ramp signal cannot continue to increment the feedback ramp signal indefinitely, and must be reset on some basis. Accordingly, the method proceeds to 840 and reset the feedback ramp signal when the feedback ramp is incremented a predetermined number of times since a previous reset. In one embodiment, the feedback ramp signal is reset by reducing the feedback ramp signal based on an average of the feedback ramp signal level over a period of time since the previous reset. In one embodiment, the feedback ramp signal is also reset whenever the feedback ramp signal level is incremented by more than a predetermined value since the previous reset. In that case, the feedback ramp signal level is reduced an amount that will produce a $2\pi$ phase shift in the phase difference between the two counter-propagating light waves.

Figure 9:
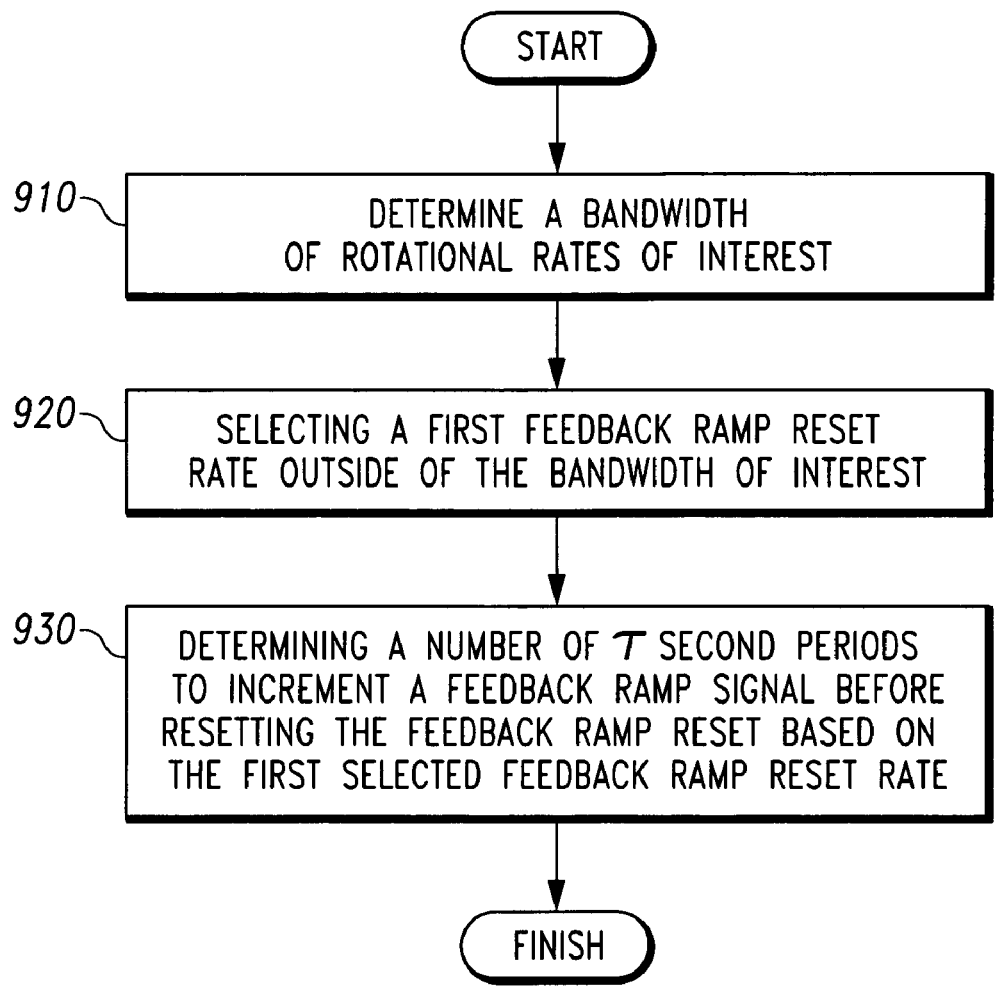
FIG. 9 is a flow chart illustrating a method of one embodiment of the present invention.

FIG. 9 is a flow diagram illustrating a method of one embodiment of the present invention, for a method for designing a closed loop feedback system for a fiber optic gyroscope. The method begins at 910 with determining a bandwidth of rotational rates of interest. Depending on the application in which the optical gyroscope is employed, the optical gyroscope will have a rated range of angular velocities in which it will be expected to accurately operate. While operating in that range the optical gyroscope will generate a rate signal that is a function of its angular rate of rotation. The bandwidth of rotational rates of interest comprises those rate signals that could be expected while operating within the rated range of angular velocities. By selecting a feedback ramp reset frequency outside of the bandwidth of rotational rates of interest (at 920), any rate dependent sinusoidal signals caused by feedback ramp resets will fall outside of the bandwidth of interest and thus not interfere with generating accurate rate signals. To implement the selected feedback ramp reset frequency, the method proceeds to 930 and determines a number of τ second periods to increment a feedback ramp signal before resetting the feedback ramp reset based on the first selected feedback ramp reset rate. On occasion, because of the selected frequency of feedback ramp resets, an undesirable amount of noise will result from blocking unreliable data generated immediately after a reset. In that case, the method further comprises selecting a lower feedback ramp reset rate, somewhere between the originally selected feedback ramp reset rate and the bandwidth of rotational rates of interest to reduce signal noise. Then, based on the lower feedback ramp reset rate the method determines the number of τ second periods to increment a feedback ramp signal before resetting the feedback ramp reset.

Several means are available to implement the feedback processors, analog-to-digital and digital-to-analog converters, demodulators, accumulators, and other elements of embodiments of the present invention. These means include, but are not limited to, digital computer systems, programmable controllers, or field programmable gate arrays. Therefore other embodiments of the present invention include program instructions resident on computer readable media that when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method for generating a closed loop feedback signal for a fiber optic gyroscope, the method comprising:

demodulating a signal to determine a phase difference between two counter-propagating light waves;

determining a rate of rotation based on the phase difference;

incrementing a feedback ramp signal once every τ second period based on the rate of rotation, the feedback ramp signal having a fixed frequency and a variable amplitude;

resetting the feedback ramp signal based on the fixed frequency when the feedback ramp signal is incremented a predetermined number of times since a previous reset; and selecting the predetermined number of times since the previous reset to minimize undesirable output rate oscillations resulting from the feedback ramp signal that occur outside a critical frequency band of interest for the fiber optic gyroscope.

2. The method of claim 1, further comprising:
inhibiting one or both of demodulating a signal and determining a rate of rotation for one or more τ second periods after resetting the feedback ramp signal.

3. The method of claim 1, further comprising:
generating a bias modulation signal adapted to increase the phase difference between the two counter-propagating light waves based on one or more operating points; and
summing the bias modulation signal with the feedback ramp signal.

4. The method of claim 3, wherein generating the bias modulation signal further comprises: estimating a voltage value; and
inhibiting estimating the voltage value for one or more τ second periods after resetting the feedback ramp signal.

5. The method of claim 1, further comprising:
resetting the feedback ramp signal when the feedback ramp signal level is incremented by more than a predetermined value since the previous reset.

6. The method of claim 5, wherein resetting the feedback ramp signal when the feedback ramp signal level is incremented by more than a predetermined value since the previous reset further comprises:
reducing the feedback ramp signal to produce a 2n phase shift in the phase difference between the two counter-propagating light waves.

7. A method for generating a closed loop feedback signal for a fiber optic gyroscope, the method comprising:
demodulating a signal to determine a phase difference between two counter-propagating light waves;
determining a rate of rotation based on the phase difference;
incrementing a feedback ramp signal once every τ second period based on the rate of rotation; and
resetting the feedback ramp signal when the feedback ramp signal is incremented a predetermined number of times since a previous reset,
wherein resetting the feedback ramp signal includes reducing the feedback ramp signal based on an average of the feedback ramp signal level over a period of time since the previous reset.

8. A system for generating a closed loop modulation waveform feedback signal for an optical gyroscope, the system comprising:
means for demodulating signal to determine a phase difference between a first light wave and a second light wave;
means for determining a rate of rotation based on the phase difference between the first light wave and the second light wave, the means for determining the rate of rotation responsive to the means for demodulating;
means for generating a feedback ramp signal, wherein the means for generating the feedback ramp signal increments the feedback ramp signal based on the rate of rotation, the means for generating the feedback ramp signal responsive to the means for determining the rate of rotation; and
means for resetting the feedback ramp signal when the ramp is incremented a predetermine number of times since a previous reset, the means for resetting the feedback ramp signal responsive to the means for generating the feedback ramp signal,
wherein the means for resetting the feedback ramp signal includes reducing the feedback ramp signal based on an average of the feedback ramp signal level over a period of time since the previous reset.

9. The system of claim 8, further comprising:
means for inhibiting one or both of the means for demodulating a signal and the means for determining a rate of rotation for one or more r second periods after resetting the feedback ramp signal.

10. The system of claim 8, further comprising:
means for generating a bias modulation signal adapted to increase the phase difference between the two counter-propagating light waves based on one or more operating points; and
means for summing the bias modulation signal with the feedback ramp signal.

11. The system of claim 8, further comprising:
means for resetting the feedback ramp signal when the feedback ramp signal level is incremented by more than a predetermined value since the previous reset.

12. The system of claim 11, wherein the means for resetting the feedback ramp signal when the feedback ramp signal level is incremented by more than a predetermined number of times is adapted to reduce the feedback ramp signal to produce a 2n phase shift in the phase difference between the two counter-propagating light waves.

* * * * *